May 18, 1954 N. C. BREMER 2,678,569
POWER TRANSMISSION CHAIN
Filed Dec. 23, 1950 2 Sheets-Sheet 1
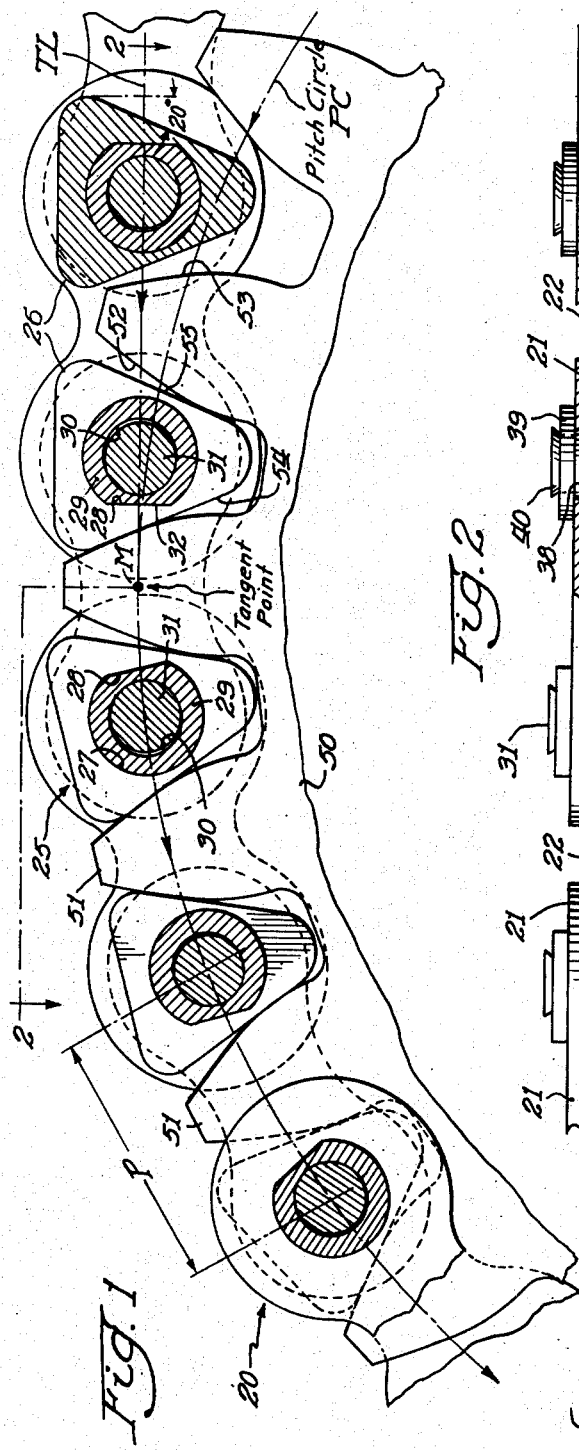
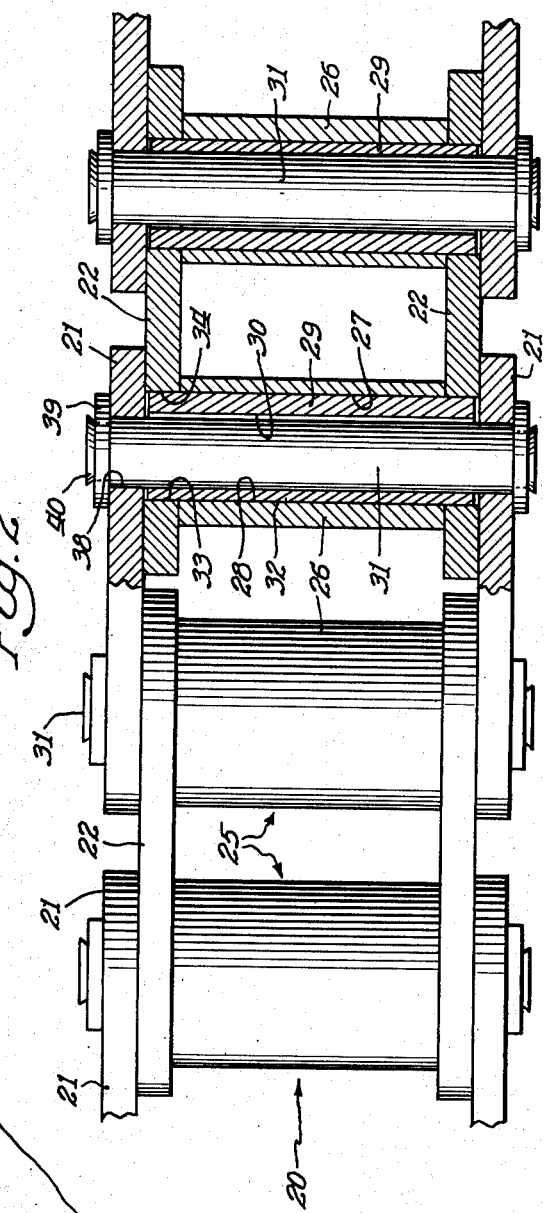
Inventor:
Norman C. Bremer May 18, 1954   N. C. BREMER   2,678,569
POWER TRANSMISSION CHAIN
Filed Dec. 23, 1950   2 Sheets-Sheet 2
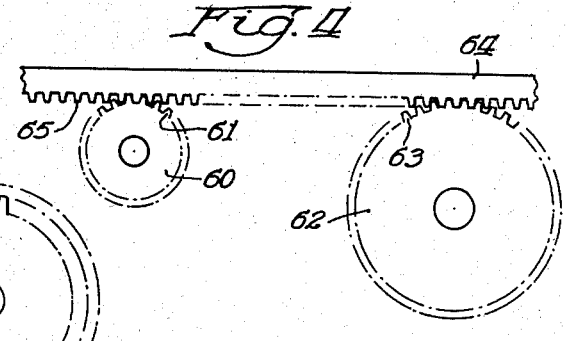
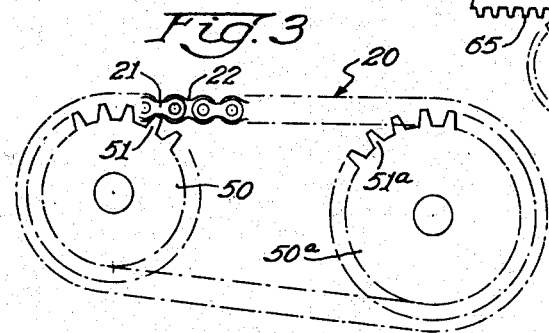
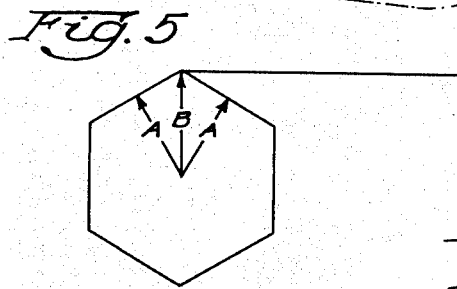
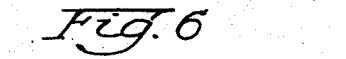
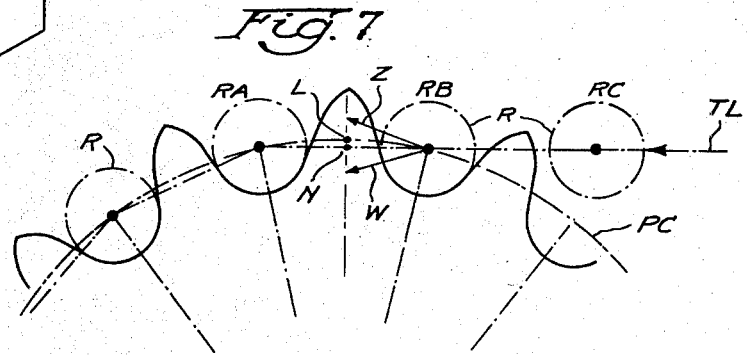
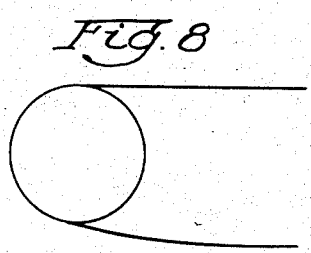
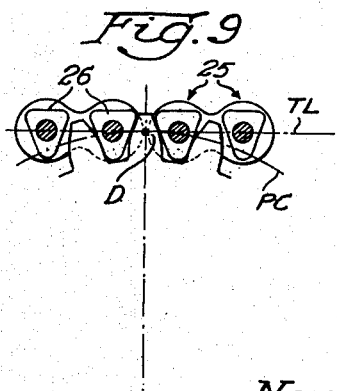
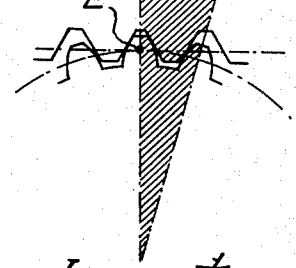
Inventor:
Norman C. Bremer Patented May 18, 1954

2,678,569

UNITED STATES PATENT OFFICE 2,678,569

POWER TRANSMISSION CHAIN

Norman C. Bremer, Ithaca, N. Y., assignor to Morse Chain Company, Ithaca, New York, a corporation of New York Application December 23, 1950, Serial No. 202,544

3 Claims. (Cl. 74—243)

This invention relates in general to new and useful improvements in power transmission chains and more particularly to chains adapted for extra heavy duty and which can be run at relatively high speeds.

Otherwise stated, the invention is embodied generally, in chain drives, and particularly to that type of chain drive wherein the chain is comprised of a series of links connected by pivot pins, and is directed particularly to improvements in the sprocket engaging elements thereof.

More specifically stated, it is a general object and accomplishment of the invention to provide improvements in power transmission chains which makes possible true tangential engagement to and from the sprocket teeth, thus eliminating the chordal speed change which is usually associated with chains of this type, this invention contemplating means of eliminating chordal action or polygonal effect usually associated with roller chains or silent chains, thus eliminating objectionable noise, destructive impact and heating.

The invention consists of substituting, in a roller type chain, V-shaped blocks for the usual rollers and these V-shaped blocks being locked in a fixed position so that when the chain is in its straight line position the V-shaped blocks function in a manner quite similar to that of a rack engaging an involute pinion. The blocks can be made to employ conventional pressure angles so that the sprocket forming tools would be very similar to a conventional involute gear with the exception that the space between the teeth might be somewhat wider than in the gear with a corresponding thinning of the gear teeth.

It is important to understand that maintenance of a relatively tight chain of the character contemplated by this invention over a long period of operation in certain classes of power transmission service has been a long sought for need in the industry.

Accordingly, it is the primary object and accomplishment of this invention to provide a compact, rugged drive chain which is capable of smoother operation with less impact at meshing when operated at high speed.

Another important feature and accomplishment of the invention is to provide, in a chain of the character contemplated by this invention, a joint which substantially eliminates chordal speed changes due to sprocket action.

In this connection, it is important to understand that ordinary chains, when running on a sprocket, do not meet it exactly tangentially, but engage a sprocket tooth somewhat before the point of tangency and is then carried slightly upward and over the top of the sprocket before it settles into final engagement and is carried down around the sprocket. While the up and down motion thus transmitted to the free chain is very slight, yet it is periodic in character, occurring with each tooth, and may build up objectionable vibrations. It is, therefore, desirable both theoretically and practically, to make a chain which will travel more truly on a straight line during the process of engagement with the sprocket tooth, so that whatever the motions given the parts in contact with the sprocket, the free portions of the chain will receive merely a straight line pull.

A further object and accomplishment of the invention is to provide a chain having better wearing areas and more efficient coaction with the sprockets than standard roller chains.

In this connection another purpose of the present invention is to control the action of the bearing and wearing surfaces as to regulate wear.

Another important object of the invention is to provide a chain and sprocket of the type wherein the sprocket teeth engage driving collars or rollers of the chain, said collars defining a shape or contour adapted to assist in the meshing of the chain with the sprocket to eliminate joint articulation and variations in chain velocity relative to sprocket velocity as the chain approaches and runs onto the driving sprocket.

Another object of the invention is to improve the kinematic action of the joint by providing a more gradual transition from straight to rotary motion as the chain engages the sprocket and thus provide a quiet and smooth running chain.

In this connection, it is a further object of the invention to provide a chain of the driving collar type having driving and driven contact surfaces of considerable area which flatly engage similar surfaces of the sprocket with the result that there is provided lower unit pressure and better wearing value.

Otherwise stated, it is an important object of the invention to provide a power transmission chain which will run onto or mesh with a sprocket having few teeth under driving tension without any joint articulation occurring until the chain actually starts to partake of the angular motion of the sprocket and with the linear velocity of the chain coinciding with the angular velocity of the sprocket, thereby materially lessening the shock of meshing and the tendency to wear the driving teeth and resulting in smoother and more quiet operation.

More specifically stated, it is a further object and accomplishment of the invention to direct and control the motion of the driving joint picked up by the sprocket tooth as the chain engages the sprocket, with the result that the chain, in going from the straight run to run over the sprocket, will take a form more nearly curved than polygonal, whereby whipping is reduced and the shortening effect thereof upon the effective life of the chain is minimized.

An ancillary object and accomplishment of the invention is to provide a new and improved chain of the driving collar type which is adapted to be economically manufactured and which is so designed as to permit the manufacture and assembly thereof in accordance with present day large scale mass production manufacturing methods of construction and assembly.

The invention seeks, as a final object and accomplishment, to provide a power transmission chain assembly particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described, and as more particularly pointed out in the appended claims.

Embodiments of the invention are illustrated in the accompanying drawings forming a part hereof and wherein:

Fig. 1 is an elevational view of a power transmission chain embodying the features of the present invention and illustrated in operative association with a sprocket, this view having parts thereof shown in section to illustrate the internal construction thereof to better advantage;

Fig. 2 is a top plan view of the chain depicted in Fig. 1 and with portions thereof shown in section, this view being taken substantially on the plane of the line 2—2 in Fig. 1;

Fig. 3 shows a driving sprocket, a driven sprocket and an endless chain as depicted in Fig.1 cooperating therewith;

Fig. 4 illustrates a pair of sprockets of different diameters operatively associated with a rack to depict an ideal chain action;

Fig. 5 illustrates a polygon figure to diagrammatically define the action of a conventional chain upon a conventional sprocket;

Fig. 6 illustrates in graphic form the sine line imparted by the action of a conventional chain being wrapped upon a conventional sprocket;

Fig. 7 illustrates the action of a conventional roller and/or silent chain when wrapped upon a conventional sprocket;

Fig. 8 graphically illustrates a belt engaging a smooth pulley which imparts the action desired in chain applications;

Fig. 9 diagrammatically illustrates the instant chain constructed as a rack and the sprocket as a gear in order to give true constant chain action; and Fig. 10 graphically illustrates the mechanics of a gear in engagement with a rack.

The drawings are to be understood to be more or less of a schematic character for the purpose of illustrating and disclosing typical or preferred forms of the improvements contemplated herein and in the drawings like reference characters identify the same parts in the several views.

Broadly speaking, the invention contemplates a chain which may be classified as a hybrid in that it possesses all of the desirable heavy duty rugged drive characteristics of roller chains and yet possesses the highly desirable characteristics of high speed, quiet and smooth operation generally related to silent chains. Thus, the instant chain is versatile in that it may be employed universally to all classes of service where, heretofore, roller chains and silent chains were restricted to certain classes of service. Otherwise stated, a chain incorporating principles of construction of this invention may be employed in heavy duty rugged power transmission service or may be employed equally as well for high speed silent operation such as, for example, an automotive timing chain.

The aforementioned features of this invention consists of substituting, in a roller type chain, V-shaped blocks for the usual rollers, these V-shaped blocks being locked in a fixed position so that when the chain is in its straight line position the V-shaped blocks function in a manner quite similar to that of a rack engaging an involute pinion. The aforementioned blocks can be made to employ conventional pressure angles so that the sprocket forming tools would be very similar to a conventional involute gear with the exception that the space between the teeth might be somewhat wider than in the gear with corresponding thinning of the gear teeth.

Accordingly, in the exemplary embodiment of the invention depicted in Figs. 1, 2 and 3, this is advantageously accomplished by the new and improved chain, with which the invention is particularly concerned and indicated in its entirety by the numeral 20, and which comprises, in general, a plurality of chain links as at 21 and 22 interrelated in a manner to define a chain of the link jointed type, said links being provided with chain joints indicated in their entirety in each instance by the numeral 25 and arranged to permit relative pivotal movement between the related chain links, and the joints, in each instance, comprising a V-shaped block 26 having a generally annular through opening 27 with portions thereof defining a flat seat 28 and adapted to receive a bushing 29 having the same general contour of the through aperture 27 and the flat seat 28 and provided with a central through bore 30 adapted to receive a chain pin as at 31.

As can be best seen in Fig. 2, the flat surface 32 disposed on the periphery of the bushing 29 and corresponding to the flat seat 28 forming a part of the aperture 27 of the V-shaped block 26, is engaged with a corresponding flat seat 33 forming a part of an annular through aperture 34 of the chain link 22 thereby preventing relative rotation therebetween. Thus, it can be seen that by virtue of the fixed relationship between the chain link 22 and the bushing 29 and because of the fixed relationship between the bushing 29 and the V-shaped blocks 26 accomplished by the provision of the mating flat seat 29 and the flat surface 32, relative movement of the V-shaped blocks 26 with respect to a related chain link as at 22 will be defeated.

Attention is directed to Figs. 1 and 2 wherein the chain pin 31 is shown as having a loose fit in the through aperture 27 of the bushing 29 and is shown, in Fig. 2, as projecting outwardly of the bushing with end portions thereof being received in a tight fit relationship in an annular through aperture 38 disposed in the chain link 21. Moreover, the extreme outer end portions of the chain pin 31 is arranged to receive a washer 39 and, thereafter, is swaged as at 40 in order to maintain the relative disposition of the parts. In reviewing Fig. 2, it can be seen that each end of the pin is arranged in a similar manner. Accordingly, it is deemed sufficient for all intentions and purposes herein contained to describe only one end portion.

In Fig. 1 the chain 21 is shown in the initial stages of being wrapped upon a sprocket indicated in its entirety by the numeral 50 and comprising a plurality of sprocket teeth as at 51 each having curved working surfaces 52 and 53 formed to define the general shape of an involute gear with the exception that the space between the teeth is somewhat wider than in a conventional gear; this space being reconciled by a corresponding thinning of the gear teeth.

As can best be seen in Fig. 1, the V-shaped blocks 26 are formed to define a generally triangular shape with working surfaces 54 and 55 having a pressure angle of approximately 20 degrees and giving the general resemblance of teeth of a rack. Particular attention is directed to the fact that the working surfaces 54 and 55 of the V-shaped blocks 26 are straight while the working surfaces 52 and 53 of the sprocket teeth 51 are curved thereby to provide a conjugate relationship between the respectively working surfaces when the chain is disposed in driving relationship on a sprocket as at 50 thereby providing a chain which, when running on a sprocket as at 50, will meet this sprocket exactly tangentially whereby the heretofore objectionable chordal action found in conventional chains is eliminated and providing materially, lessening of the shock of meshing and the tendency to wear the driving teeth and resulting in smoother and more quiet operation.

Having thus generally described the structural features of the instant chain, it is felt important to discuss the general theory of operation to effectively define the coaction of the various elements of the instant chain in accomplishing its novel operational characteristics.

For purposes of discussion and in order to more clearly identify the apparent differences of construction of the instant chain with respect to conventional roller chains heretofore generally employed, it is deemed important to state that the most commonly used type of roller drive chain, and what is known as standard roller drive chain, is made up of inside and outside links having straight or flat side bars. The opposite ends of the side bars for the inside links are connected by tubular bushings. The opposite ends of the side plates for the outside links are connected together and are joined to the ends of the inside links by chain pins. These chain pins pass through the bores of the bushing to form articulating joints between adjacent links. A driving roller, as distinguished from the V-shaped blocks 26 of the instant invention, is journaled on each bushing. These driving rollers engage the working faces or contact surfaces of the sprocket teeth. The standard roller chain just described is so well known that it is not believed to be necessary to provide a figure on the drawings to illustrate the same.

Attention is now directed to the conventional form of sprocket wheel arrangement for a standard roller chain drive, this sprocket wheel arrangement may consist of a driven sprocket and a driver or driving sprocket with the driver sprocket being of less diameter than the driven sprocket. It is important to understand that with a drive assembly of the type just described that there are several principal points of chain action: (1) at the points where the chain leaves the driver and the driven sprocket, there is no appreciable shock produced; (2) at the point where the chain contacts or runs onto the driven sprocket, there occurs a slight joint articulation, but as the chain is not operating under a driven tension but is running slack, the shock which does occur is not sufficient to have a materially detrimental effect on the life of the chain and the driven sprocket; and (3) at the point where the chain runs onto the driver, however, the chain is under driving tension and the destructive shock which really has a detrimental effect occurs at this point.

In order to have a clear understanding of the particular chain action which produces the detrimental objectionable and destructive shock at the point where the chain runs onto the driver, particular attention is directed to the diagrammatic showing of this chain action in Fig. 7, wherein the arcuate line PC may be considered as representing the pitch circle of a driving sprocket and the circles R may be considered as representing the driving rollers of a standard roller chain.

In Fig. 7 it can be seen that the driving rollers as at R approach the pitch circle PC along the line TL and travel in the direction indicated by the arrow-head associated with this line, and the characters RA, RB, RC represent positions occupied by each driving roller R as it approaches and runs onto the sprocket. In this connection, the position RA illustrates a driving roller R which has been wholly seated on the sprocket and its axis or center of articulation is arranged in the pitch circle PC and the driving roller has an angular velocity the same as that of the sprocket. Particular attention is directed to the position of a roller R represented by the character RB, this position being one which is assumed by a driving roller just as it is coming into its seat on the tooth of the sprocket and, it is important to understand, that during its travel from the position represented by the character RC toward the position represented by the character RB, the direction of motion of each roller is governed by the direction of motion of the next preceding roller during its respective travel position RB to the position RA; otherwise stated, the following roller partakes of the motions of the leading roller. It is notable that at the time the following roller is moving into contact with the sprocket, which contacting position is represented by the position RB, its direction of motion is indicated by the arrow line W, and it is extremely important to note, that at the instant of contact, the direction of motion abruptly changes to that indicated by the arrow line Z. It will be appreciated that this abrupt change in direction of travel occurs as a result of contact of the roller with the sprocket and a very destructive shock must necessarily result. Therefore, if this abrupt change in the direction of travel at the instant of contact is either entirely eliminated, or materially reduced, the resultant shock likewise will either be eliminated or reduced.

Thus, it has become apparent that during the travel of a driving roller from the position RB to the position RA, it has been acting as a lead horse controlling the direction of motion and the rate of advance of the driving section of the chain; however, because of the change in the direction of motion of each driving roller in moving from the position RC to the position RA, the linear velocity of the approaching driving rollers cannot coincide with or be the same as the angular velocity of the rollers in traveling from the position RA around the periphery of the sprocket. Accordingly, it is necessary for the driving rollers to change their velocity or rate of travel in approaching and actually running onto the sprocket, and it is important to understand that this change in the travel and change in velocity will produce a very sharp destructive impact or shock. Moreover, it is not difficult to appreciate how the intensity of the impact or shock increases rapidly as the velocity increases and the number of sprocket teeth decrease. Furthermore, it is recalled that the chain contemplated by this invention is proposed not only for heavy duty rugged drive power transmission service but for power transmission services requiring high speed silent operation, these classes of services obviously emphasizing the importance of elimination of shock due to impact between the chain and sprocket. Still further, an increase in the weight of a chain operating at high speed, also increases the intensity of the impact or shock which occurs as the chain runs onto the driver.

Thus, it is important to note that one of the principal purposes of this invention is to provide a chain and sprocket drive assembly which permit the chain to approach and run onto the sprocket without change in direction of motion and at a linear velocity which is the same as the angular velocity of the sprocket, thereby eliminating the destructive shock produced by the chain action described hereinbefore with respect to the disclosures in Fig. 7.

In order to have a clear understanding of how the instant chain overcomes the apparent deficiencies hereinbefore described, it is deemed important to relate the governing conditions relating to chain drive reaction.

Heretofore, it has been axiomatic that the engagement of a series of jointed links for a chain when in engagement with a wheel or sprocket that is being rotated at a constant velocity must create at some portion of the cycle a change in linear velocity of the chain.

The speed characteristic of a usual type of conventional roller or silent chain engaging a tooth wheel or sprocket is almost identical to that of a steel tape which would be driving or be driven by a polygon shaped wheel as shown in Fig. 5. The speed characteristics of this system might be described graphically as shown in Fig. 5 wherein a tape at one instant is moving at a velocity described by radius A, then accelerates until it is moving at a rate equal to radius B, then decelerates to A again.

The action hereinbefore described of a conventional roller or silent chain is shown in Fig. 7. It will be noted that the change of velocity occurs in the chain when the major portion of the load is being transmitted to or from the sprocket teeth. This chordal action or, as it is sometimes described, chordal rise and fall of the chain, sets up not only impact stresses in the chain parts due to the hammer blow action of the links but also because of the rapid variation in the velocity of the chain which is being resisted by the inertia of the driving or driven masses create severe pulsating and rapidly recurring tensile stresses in the links of the chain. These loadings seriously reduce the effective transmissibility of the power in the chain and, if not offset by sufficient added strength in the chain, will result in fatigue of the parts.

Many attempts have been made to compensate or neutralize the effect of chordal action. The invention contemplates making the V-shaped blocks 26 of the chain 20 of a rack form and the teeth 51 of the sprocket 50 in the form of a gear which in action would simulate the action of a gear engaging a rack. It has been found that such measures are quite effective, and when applied to a chain drive as contemplated herein, result in quieter operation and a marked increase in the chain power transmitting ability due to the lessened speed changes or velocity pulses in the strand of the chain between the sprockets.

In general, I propose to generate the working surfaces 52 and 53 of the sprocket tooth 51 with respect to the working surfaces 54 and 55 of the V-shaped blocks 26, so that as one rotates into and out of engagement with the other, the surfaces are conjugate one to the other. The result is a chain drive having V-shaped blocks as at 26 simulating chain teeth of a silent type chain, and sprocket teeth in driving relation one with the other, wherein, instead of having two more or less flat surfaces moving into contact with one another along generally normal lines and thereby setting vibrations and noise by impact, I will have opposed curved surfaces coming into contact one with the other with a combined rolling and sliding action.

This further results in a chain sprocket drive wherein, by the inter-relation between these conjugate surfaces (Fig. 1), the chain tends to enter and leave contact with the sprocket along a line (TL) tangent to the pitch circle (PC), instead of approaching along a line other than the tangent and seeking the pitch circle as contact takes place.

Graphically, the action that is always desired may be that of a belt engaging a smooth pulley as shown in Fig. 8. As stated hereinbefore, prior chains were constructed so that at some portion of the cycle of a chain engaging a sprocket there was a change in velocity, consequently the Utopian condition shown in Fig. 8 could not be realized. It is possible, however, to construct the sprocket as a gear and the chain as a rack and get true constant chain action if the chain is allowed to travel in a straight line as illustrated in Fig. 9.

Any attempt, however, to flex the chain after it leaves point D around the curved portion of the sprocket is bound to result in a variation in the velocity of the chain during the time that the joint is flexing or articulating. The amount of change in velocity, of course, is directly proportionate to the pitch of the chain.

The mechanics of a gear in engagement with a rack are such that actual transfer of pressure or energy is during a portion of the cycle shown by the shaded portion in Fig. 10.

Properly to develop a chain and sprocket combination which would simulate a gear rack action, it is necessary that contact with the chain occur at points at either side of the tangent point E as shown in Fig. 10. From this, it will be understood that a chain link having a rack form and in engagement with a gear shaped sprocket must be of a form and of such dimension that contact with the sprocket teeth occurs considerably ahead of the actual tangency point of the sprocket and chain.

A study of the action of a chain and sprocket of such design revealed that the velocity of the chain remains constant for exactly half of the period of joint articulation, this being the portion of the cycle when the chain is approaching the tangency of the sprocket. During this time, the actual effective radius of the sprocket changes; the largest effective radius being at the instant of engagement, the minimum effective radius being when the joint has articulated one-half of its normal cycle. This change in effective radius is the reason that a chain contemplated by this invention does not exhibit the characteristic chordal action and behaves more like a gear with true linear velocity characteristics.

As has been hereinbefore stated, one of the undesirable characteristics of chains in use prior to this invention is known in the art as chordal action, and this condition is effectively overcome by the teachings of this invention. A chain which approaches a sprocket along a path other than the line tangent to the pitch circle is finally forced into general conformity with the pitch circle by contact with sprocket teeth and the transverse movement of individual links resulting therefrom is transmitted to the approaching link, thus causing their paths of approach to the sprockets to be a wave something like a sine wave illustrated in Fig. 6. This chordal action gives the chain a varying linear velocity together with transverse motion.

Chordal action may be easier to visualize if we consider the reverse condition of rolling a sprocket, which is equivalent to the pitch polygon illustrated in Fig. 5, on a plain surface. The axis of the sprocket would then have the wave motion which is normally imparted to the chain. Mathematically, the amplitude of the transverse motion of the earlier form of chain is equal to the versed sine of the angle 180 degrees divided by the number of teeth in the sprocket.

A chain made in accordance with this invention using conjugate working surfaces has none of these undesirable characteristics. Its entrance onto a sprocket is substantially along a line tangent to the pitch circle so that its linear velocity in substantially uniform, and transverse motion is absent. Noise due to impact is therefore reduced and internal stresses set up in the links are reduced to a minimum.

At the time that the chain has reached its point of tangency as shown in Fig. 1, articulation has not been completed and to fully flex the joint and wrap the sprocket, the link must assume a position with respect to the sprocket teeth which places the pitch point of the chain again at the point of largest effective radius. It is this portion of the time which is between the points of tangency and the time at which the chain is fully wrapped that the speed change hereinbefore discussed actually occurs.

The conjugate action of the instant chain (Fig. 1) coupled with the instant specifically designed V-shaped blocks 26 as employed with sprocket gear teeth as at 50 and their combined coaction as taught by this invention is the means of accomplishing the desirable objectives in obtaining true tangential approach and departure to and from the sprocket.

Also, within the spirit of this invention is the combination of a link chain having V-shaped blocks with curved engaging surfaces and a sprocket engaging the chain having straight sided teeth, the effect of which could be made to be the same as that of the disclosed straight sided V-shaped blocks 26 when employed with a sprocket as at 50 having curved teeth as at 51.

Referring to Fig. 4, there is shown a driving sprocket 60 having teeth 61, a driven sprocket 62 having teeth 63, and a rack 64 of infinite length having teeth 65 cooperating with teeth 61 and 63. It is well known that substantially uniform rotation may be transmitted from the driving sprocket 60 to the driven sprocket 62 if the involute system of gear cutting is used. By this system, teeth 65 of the rack 64 are made straight sided with a predetermined pressure angle, and the teeth 61 and 63, respectively of the sprockets 60 and 62, are then cut from a hob having a profile of the rack teeth 65. If the rack 64 is of infinite length, the driving sprocket 60 can drive driven sprocket 62 as long as is desired.

Attention is now directed to Fig. 3 wherein there is shown the sprocket 50, which may be considered the driving sprocket, and a driven sprocket 50a having, respectively, teeth 51 and 51a. Wrapped around both sprockets is the endless chain 20 which is comprised of a plurality of individual links as at 21 and 22 and having V-shaped blocks as at 26 disposed therebetween at each articulating joint thereof, and connected together by means of pins 31. It is obvious that the portion of the chain 20 located between the sprockets and commonly called the strand, resembles rack 64 illustrated in Fig. 4.

It is particularly notable that prior to this invention it has been customary to design chain teeth with respect to a particular sprocket so that the tooth action varies with the number of teeth in the sprocket.

According to this invention, however, the V-shaped blocks 26, insofar as the working surfaces 54 and 55 thereof are concerned, are given the contour of teeth 65 of rack 64 (Fig. 4), that is, the working surfaces 54 and 55 of the V-shaped blocks 26 are straight sided, and the angle of the sides being determined from the sprocket having the minimum number of teeth which is to be cooperated therewith. I have found that the minimum pressure angle to be employed in the profile of the V-shaped blocks 26 is preferably 20 degrees as indicated in Fig. 1. Sprocket teeth 51 and 51a (Figs. 1 and 3), although appearing on sprockets of different diameters, may be cut from the same hobbing equipment, because of the rack design imparted by the V-shaped blocks 26 of the chain 20, and the use of the involute system in designing the profile of the sprocket teeth 50 and 51a.

To illustrate what I mean by generating the sprocket teeth as at 51 to give conjugate working surfaces as at 52 and 53 with respect to the working surfaces 54 and 55 of the V-shaped blocks 26, imagine a gear shaper with a cutter shaped exactly as the contour of the V-shaped blocks 26, the cutter reciprocates along its axis of rotation and rotating in unison with a lead strip feed tangentially to it and guided around it. If the linear velocity of the generating pitch line of the cutter be identical with that of the forward movement of the strip, and if the cutter reciprocates at a uniform rate, this cutter, as the strip winds about it, will cut or generate tooth profiles in the lead strip as it enters on one side and as it leaves on the other, such tooth profiles on the strip being so related to the cutter that if the cutter drives an identical strip as a flexible rack, for that is what a chain of the type contemplated herein is, there will be no appreciable chordal action and no effective differential speed between the chain and the cutter. This is so because, instead of each V-shaped block 26 picking up the load, and pushing the chain forward and dropping the chain and leaving it for the next V-shaped block to come on, the conjugate relation between the sprocket tooth and the V-shaped block will result in giving the chain a substantially uniform forward movement substantially equivalent to the tangential speed of the gears at the pitch diameter.

By conjugate surfaces, I mean tooth profiles which are of such form that one will drive the other with a constant velocity, that is, the ratio of the angular velocity of the driver to that of the driven is constant.

Attention is now directed to Fig. 1 wherein the pitch circle PC as illustrated may be defined as a function of the sprocket and the chain, and remains constant at all times for any given set of conditions. The pitch circle defines a circle whose center is the axis of rotation of the sprocket and whose periphery circumscribes a polygon whose sides are equal to the pitch of the chain and the number of whose sides equals the number of teeth in the sprocket.

The pitch of the chain indicated as P is the distance between the pivot centers of the links. In the event of chain wear, or if it stretches under load or centrifugal force, the pitch P increases, thereby to reflect an increase in the diameter of the pitch circle; however, any change in the diameter of the pitch circle resulting from wear is a gradual change extending throughout the life of the chain while the change in the pitch diameter resulting from load upon the chain or from centrifugal force, remains constant or fixed for any given load and speed.

In this connection, it is important to understand that there is no appreciable variation in the pitch circle diameter during normal operation and no fluctuation of the position of the pitch circle, along a tangent line to which the chain must enter and leave the sprocket during operation. Accordingly, as the pitch of the chain increases the individual links will ride further out in the sprocket teeth. Thus, it appears that the only result of an increase in the pitch or length of the chain is to cause the chain teeth to engage the sprocket farther out from the center, without any other change in tooth relationship.

In Fig. 1 it can be seen that when a V-shaped block as at 26 approaches a sprocket tooth as at 51 to which it is conjugate it is held up in position on the chain pitch line, which is the line TL tangent to the pitch circle, by contact with a sprocket tooth. Heretofore, conventional chain teeth engaging sprockets not employing the principles of conjugate action contemplated by this invention, will either lie inside or outside the profile of the generated surface. If it lies inside, the chain tooth will be so positioned as to locate the link pivot somewhere between the chain pitch line and the center of the sprocket at the time contact with the sprocket tooth is established. If the working surface lies outside the generated surface, the link pivot will be positioned somewhere beyond the tangent when sprocket contact is established. In either event this results in displacing the link pivot at one side or the other of the pitch circle and normal pitch line as the chain enters the sprocket and subsequently conforms to the pitch circle, thus the objectionable chordal action described hereinbefore is set up. This same reasoning applies to the chain leaving a sprocket. Moreover, in Fig. 7 there is diagrammatically illustrated the fluctuation of conventional chain and sprockets between the pitch circle and the normal pitch line.

It is deemed important for a clear understanding of the functions of the present invention to establish definitions of working surfaces of the chain links. By working surfaces I mean those surfaces 54 and 55 on the chain and those working surfaces 52 and 53 on the sprocket tooth which come together to establish a driving relation between the chain and sprocket.

It is notable that the curves for the contact surfaces 52 and 53 of a sprocket tooth as at 51 obtained by the method herein described, are conjugate to the original tooth form and the V-shaped blocks 26 have, with the sprocket teeth, the characteristic progressive rolling and sliding action which affords the desired constant velocity conditions in both the driven and driving elements. The desired conditions for ideal drive assumed as a basis for the processes of generation are thus reproduced when a sprocket 50 having teeth 51 designed after the manner herein described has operatively disposed thereon a chain composed of V-shaped blocks 26 of the shape and form used for generation.

In Fig. 1, it can be seen that chain and sprocket combinations made in accordance with this invention by the incorporation therein of the combined coaction of the specifically defined V-shaped blocks 26 with the generated conjugate tooth surfaces of the sprocket, have certain highly desirable characteristics in that chordal action is practically eliminated, and the chain enters the sprocket with constant linear velocity for any given constant angular velocity of the sprocket.

The specific design of the V-shaped blocks 26 permit no deviation from the pitch line upon entering the sprocket by reason of the aforesaid progressive contact action. This is clearly illustrated in Fig. 1 which indicates how the contact between the surfaces of the link and sprocket teeth holds the entering chain link in a position such that the points of initial articulation enter the sprocket on a line tangent to the pitch circle. Elimination of chordal action results in a material reduction of the stresses set up in the link structure, affords extreme smoothness in operation and largely reduces noise.

The instant chain structure possesses another important characteristic in that impact between the links and sprocket upon engagement is substantially eliminated. This is due for the most part to the conjugate character of the contacting surfaces. As can be seen in Fig. 1, when the link enters the sprocket, the paths traced by the contact points on both the V-shaped blocks 26 and sprocket teeth 51 are practically coincident, and the initial contact is accordingly gradual and gentle and entirely lacking in impact characteristics.

The conjugate contacting surfaces materially and favorably affect the running and wearing characteristics. The contact surfaces 54 and 55 of the chain and the contact surfaces 52 and 53 of the sprocket teeth 51 are of such form that regardless of what portion thereof may be used within lengths practical for the link and sprocket construction, the action between the link and sprocket tooth remains the same. It is important to understand that elongation due to wear in the joints or from other causes, therefore, has practically no effect upon the action of engagement and disengagement of the V-shaped blocks and sprocket teeth.

Attention is again directed to Fig. 7 wherein it can be seen that in a conventional chain drive the point of tangency is constantly varying between points L and N. Otherwise stated, the effective radius is constantly varying. In the chain contemplated between this invention the point of tangency is constant at point M (Fig. 1) and the effective radius remains constant.

Mathematically speaking, in a conventional chain drive, the linear speed of the chain pulsates. It is slower over the short radius and faster over the long radius. Also, the chain rises and falls over the varying radius. This may be calculated as follows:

$$V = 2\pi RN$$

and R will always be variable.

In the chain contemplated by this invention the linear speed of the chain is constant because the effective radius is always the same. Also, chordal rise and fall are eliminated. This may be calculated as follows:

$$V = 2\pi RN$$

and R is always constant.

Thus, it can be seen that constancy of effective radius results in a constant linear speed with no chordal rise and fall, this being accomplished by the combined reaction of the conjugate profile of the chain and sprocket contemplated by this invention.

Otherwise stated, constant effective radius plus constant rotative speed equals constant linear speed.

The instant chain and the links thereof being formed of simple parts and readily available materials lends itself to mass production manufacturing principles, thus affords a substantial saving in the manufacturing costs.

From the foregoing disclosure, it may be observed that I have provided an improved chain incorporating conjugate mating of the chain and sprocket and which efficiently fulfills the objects thereof as hereinbefore stated and which provides numerous advantages which may be summarized as follows:

1. Structurally simple, efficient and durable;
2. Economical to manufacture and readily adaptable to mass production manufacturing principles; and
3. The provision of an improved chain having structural features thereof effective to eliminate the heretofore objectionable chordal action thus to effectively increase the life of the chain.

While I have illustrated preferred embodiments of my invention, many modifications may be made without departing from the spirit of the invention, and I do not wish to be limited to the precise details of construction set forth but wish to avail myself of all changes within the scope of the appended claims.

I claim:

1. A chain drive comprising a toothed sprocket and a chain comprising a plurality of spaced link plates connected by articulated joints, each joint including: a pin having means at each terminal end thereof engaging the outside surfaces of said link plates related to said pin effective to maintain said link plates in assembled relationship, a generally annular shaped bushing freely rotatably mounted on said pin, a portion of the peripheral surface of said bushing defining a flat seat running the entire length of said bushing, and said flat seat portions adjacent the ends of said bushing respectively being received into a corresponding aperture of related link plates to restrict relative rotation therebetween, a transverse driving collar having a profile of a generally V-shape mounted on said bushing, said collar having a through bore with a flat seat arranged to accommodate said bushing having said first-mentioned flat seat to restrict relative rotation between said collar and said bushing, and said V-shaped collar providing two contact surfaces of considerable area for contact with the teeth of said sprocket.

2. A chain drive comprising the combination of a toothed sprocket and a chain comprising a plurality of spaced link plates connected by articulated joints, each joint including: a pin having means at each terminal end thereof engaging the outside surfaces of said link plates related to said pin effective to maintain said link plates in assembled relationship, a generally annular shaped bushing freely rotatably mounted on said pin, a portion of the peripheral surface of said bushing defining a flat seat running the entire length of said bushing, and said flat seat portions adjacent the ends of said bushing respectively being received into a corresponding aperture of related link plates to restrict relative rotation therebetween, a transverse driving collar having a profile of a generally V-shape mounted on said bushing, said collar having a through bore with a flat seat arranged to accommodate said bushing having said first-mentioned flat seat to restrict relative rotation between said collar and said bushing, and said V-shaped collar providing two contact surfaces of considerable area, said sprocket having teeth profiled to provide contacting surfaces of considerable area to be engaged by the contact surfaces of said driving collar, and the opposed working surfaces of the collar and the sprocket teeth being conjugate one to the other.

3. A chain drive in accordance with claim 1 wherein the contact surfaces of said V-shaped collar are substantially flat and the sprocket teeth are profiled to provide curved contact surfaces, and the opposed working surfaces of the collar and the sprocket are conjugate one to the other.

References Cited in the file of this patent

UNITED STATES PATENTS

| Number | Name | Date |
|---|---|---|
| 1,027,352 | Morse | May 21, 1912 |
| 1,176,693 | Teetor | Mar. 21, 1916 |
| 1,919,768 | Brandt | July 25, 1933 |
| 2,226,010 | Moorhouse | Dec. 24, 1940 |